US012591205B2

(12) United States Patent
Nagasawa et al.

(10) Patent No.: US 12,591,205 B2
(45) Date of Patent: Mar. 31, 2026

(54) EXTERIOR MEMBER, CASE AND TIMEPIECE

(71) Applicant: CASIO COMPUTER CO., LTD., Tokyo (JP)

(72) Inventors: Shouta Nagasawa, Machida (JP); Hajime Iguchi, Fuchu (JP); Shin Hitsumoto, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 217 days.

(21) Appl. No.: 18/277,537

(22) PCT Filed: Jan. 6, 2022

(86) PCT No.: PCT/JP2022/001008
§ 371 (c)(1),
(2) Date: Aug. 16, 2023

(87) PCT Pub. No.: WO2022/176457
PCT Pub. Date: Aug. 25, 2022

(65) Prior Publication Data

US 2024/0134318 A1 Apr. 25, 2024
US 2024/0231279 A9 Jul. 11, 2024

(30) Foreign Application Priority Data

Feb. 18, 2021 (JP) ................................ 2021-024198

(51) Int. Cl.
*G04B 37/22* (2006.01)

(52) U.S. Cl.
CPC .................................... *G04B 37/22* (2013.01)

(58) Field of Classification Search
CPC .... G04B 37/22; G04B 43/002; G04B 47/046; G04B 37/005; G04B 37/0058; G04B 37/1486
See application file for complete search history.

(56) References Cited

U.S. PATENT DOCUMENTS 5,203,841 A 4/1993 Boucheron
5,206,841 A 4/1993 Boucheron
(Continued)

FOREIGN PATENT DOCUMENTS

CN 210072336 U 2/2020
DE 7928086 U1 2/1980
(Continued)

OTHER PUBLICATIONS

Extended European Search Report dated Jan. 27, 2025 for European Patent Application No. 22755782.4.
(Continued)

*Primary Examiner* — Edwin A. Leon
(74) *Attorney, Agent, or Firm* — Scully, Scott, Murphy & Presser, P.C.

(57) ABSTRACT

An exterior member including an exterior main body which covers a whole periphery of a portion of an outer surface of a case main body in a peripheral direction; and fixing projection sections which are formed on predetermined lower edge portions of the exterior main body while projecting toward outer peripheral sides and fix the exterior main body to the case main body by a fixing member attached covering an outer peripheral surface of the case main body.

8 Claims, 8 Drawing Sheets

(56) References Cited

U.S. PATENT DOCUMENTS

| | | | | |
|---|---|---|---|---|
| 6,310,835 | B1 * | 10/2001 | Mantoan .............. | G04B 37/005 368/294 |
| 6,762,976 | B1 * | 7/2004 | Tamaru ................ | G04B 37/005 368/300 |
| 2018/0292789 | A1 * | 10/2018 | Ichimura .............. | G04B 37/225 |

FOREIGN PATENT DOCUMENTS

| | | | |
|---|---|---|---|
| EP | 0469950 | B1 | 12/1994 |
| JP | H075095 | U | 1/1995 |
| JP | H0972976 | A | 3/1997 |
| JP | H1144775 | A | 2/1999 |
| JP | 2001116859 | A | 4/2001 |
| JP | 2015031625 | A | 2/2015 |
| JP | 2016164574 | A | 9/2016 |

OTHER PUBLICATIONS

Office Action dated Jan. 30, 2026 received in Chinese Patent Application No. 202280028433.0.

* cited by examiner

EXTERIOR MEMBER, CASE AND TIMEPIECE

CROSS REFERENCE TO RELATED APPLICATIONS

This is a U. S. National Phase application of International Application No. PCT/JP2022/001008, filed Jan. 6, 2022, which is based on and claims priority from Japanese Patent Application No. 2021-024198, filed on Feb. 18, 2021, the entire contents of both of which are incorporated herein by reference.

TECHNICAL FIELD

The present invention relates to an exterior member that is used for electronic devices such as wristwatches, a case equipped with the exterior member, and a timepiece equipped with the exterior member and the case.

BACKGROUND ART

For example, a wristwatch is known which has a structure where an exterior member is interchangeably attached to a case, as described in Patent Document 1. In the case of this wristwatch, the exterior member includes a decorative section with decoration and fitting sections provided on peripheral edges of the decorative section so as to be arranged on the peripheral surface of the case.

PRIOR ART DOCUMENT

Patent Document

Patent Document 1: JP H11-44775 U

SUMMARY OF INVENTION

Problem to be Solved by the Invention

However, this type of wristwatch has a problem in that, due to the structure where the exterior member is attached to the case by the decorative section of the exterior member being arranged on the upper surface of the case and the fitting sections of the exterior member being fitted together with the peripheral surface of the case, the exterior member tends to come off the case when the fitting of the case and the exterior member is loose, or the case may be damaged when the fitting of the case and the exterior member is tight.

In order to solve this problem, an exterior member has been conceived which has a structure where a decorative section is provided with engaging sections into which watch bands are inserted and which engage with band attachment sections of a case. However, this exterior member has a problem in that, due to the structure where the watch bands are required to be inserted into the engaging sections of the exterior member, the attachment and detachment of the exterior member is bothersome and therefore the exterior member cannot be easily switched.

An object of the present invention is to provide an easily interchangeable exterior member, a case equipped with the exterior member, and a timepiece equipped with the exterior member and the case.

Means for Solving the Problem

An embodiment of the present invention is an exterior member comprising: an exterior main body which covers an outer surface of a case main body; and fixing projection sections which are formed on predetermined lower edge portions of the exterior main body while projecting toward outer peripheral sides and fix the exterior main body to the case main body by a fixing member attached covering an outer peripheral surface of the case main body.

Another embodiment of the present invention is a case comprising: a case main body; an exterior member which has an exterior main body covering an outer surface of the case main body and fixing projection sections formed on predetermined lower edge portions of the exterior main body while projecting toward outer peripheral sides; and a fixing member which is attached covering an outer peripheral surface of the case main body and fixes the exterior member to the case main body by holding down the fixing projection sections on the case main body.

DESCRIPTION OF EMBODIMENTS

An embodiment where the present invention has been applied in a wristwatch will hereinafter be described with reference to FIG. 1 to FIG. 8.

Figure 1:
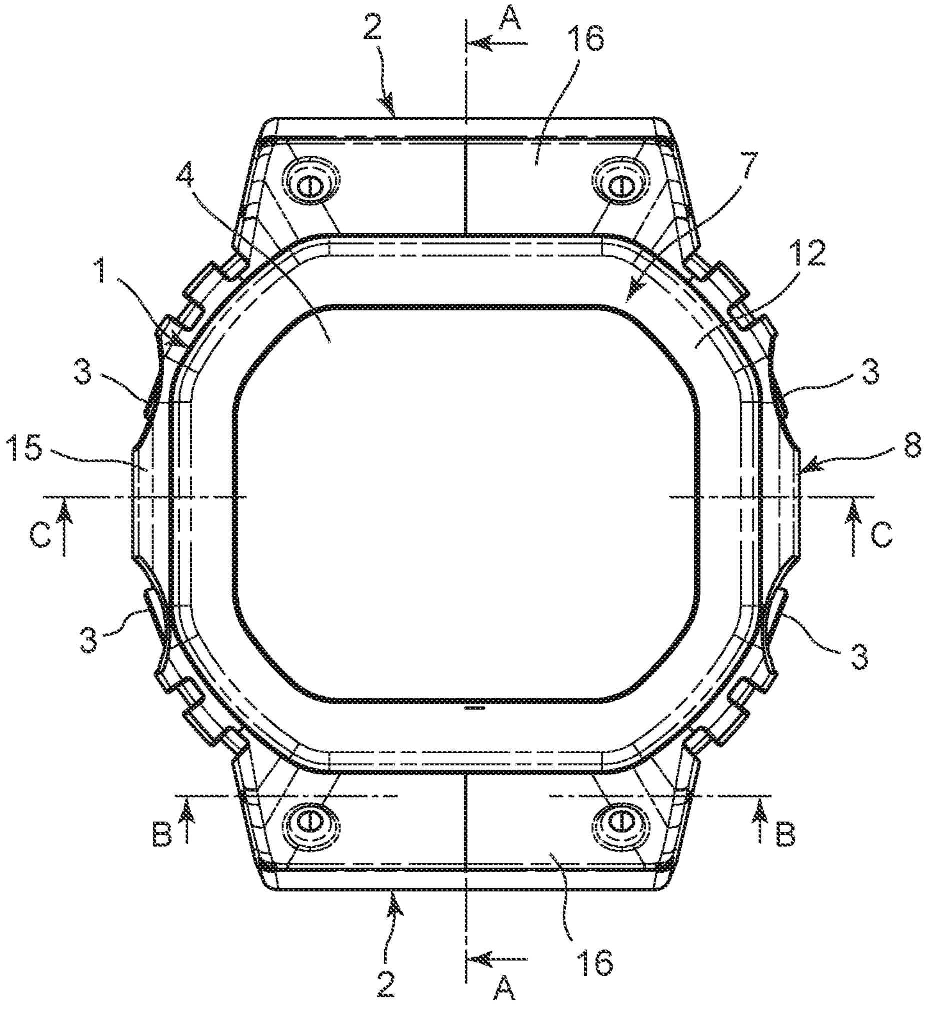
FIG. 1 is an enlarged front view of an embodiment where the present invention has been applied in a wristwatch.
Figure 2:
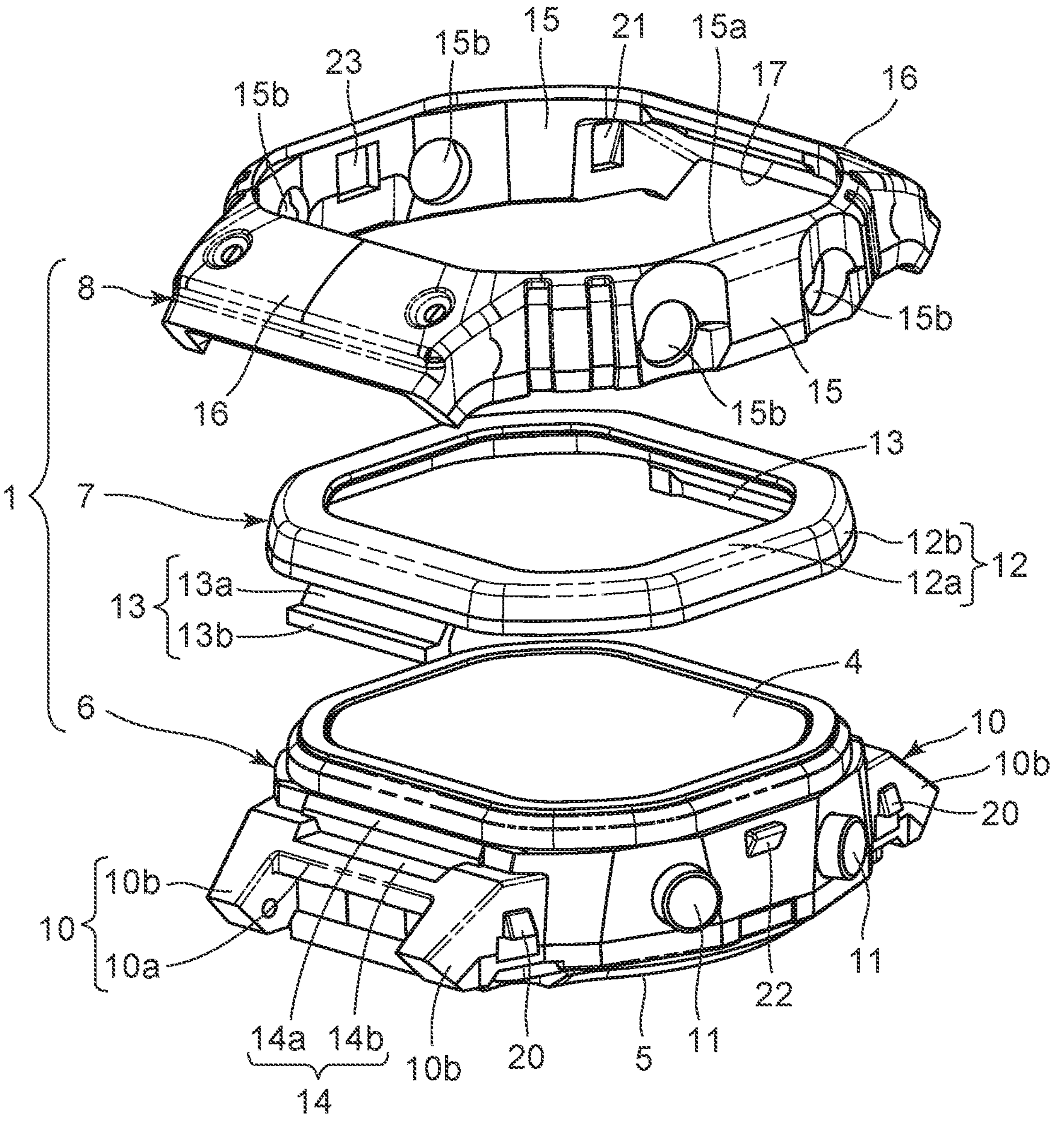
FIG. 2 is an exploded and enlarged perspective view of a wristwatch case shown in FIG. 1.
Figure 3:
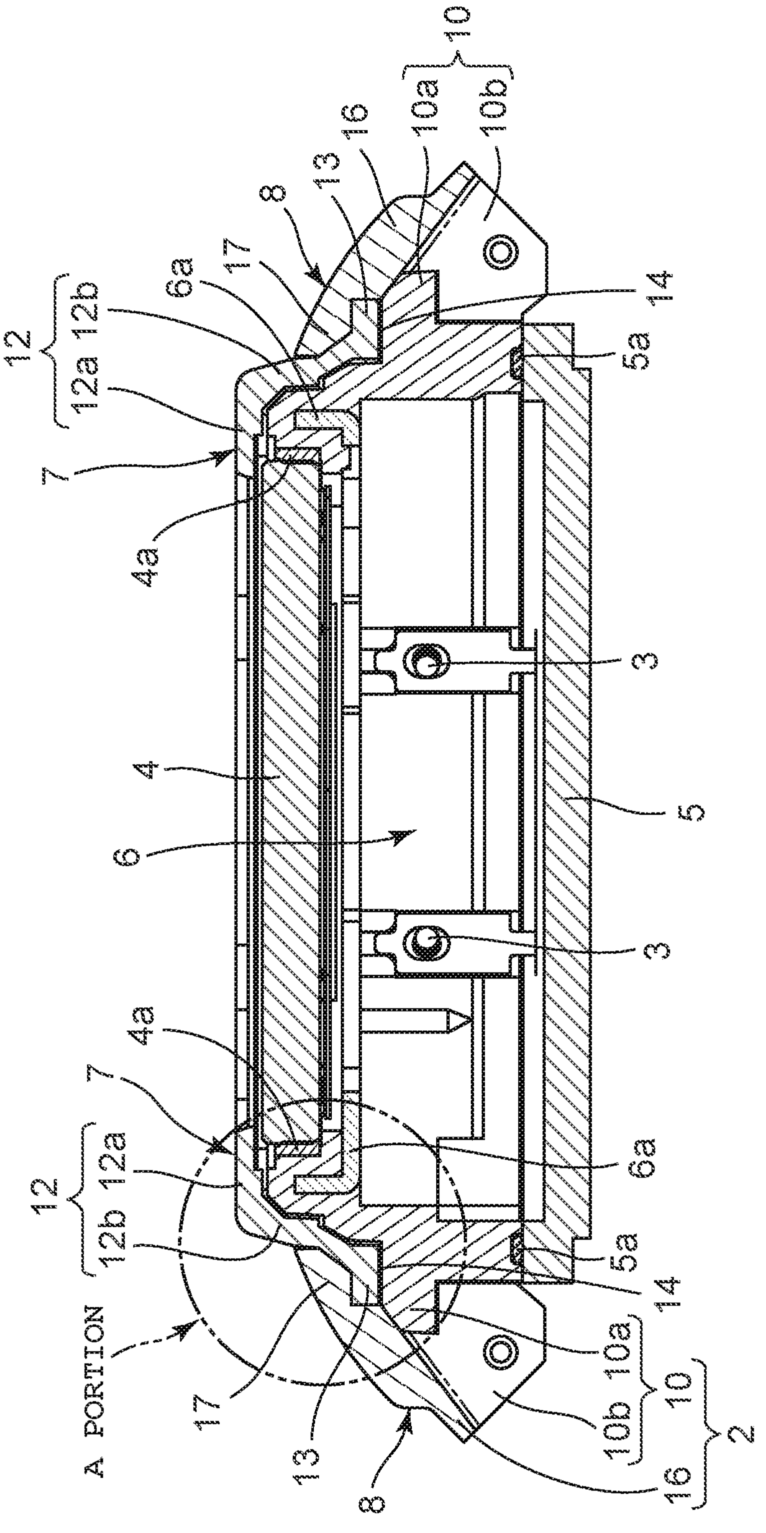
FIG. 3 is an enlarged cross-sectional view of the wristwatch case taken along the A-A arrow view in FIG. 1.

This wristwatch includes a wristwatch case 1, as shown in FIG. 1 to FIG. 3. On the twelve o'clock side and six o'clock side of this wristwatch case 1, later-described band attachment sections 2 to which watch bands (not shown) are attached are provided.

On the two o'clock side, four o'clock side, eight o'clock side and ten o'clock side of this wristwatch case 1, switch sections 3 are provided, as shown in FIG. 1. Also, to the upper opening of this wristwatch case 1, a watch glass 4 is attached via a glass packing **4*a*, as shown in FIG. 1 to FIG. 3. To the lower part of this wristwatch case 1, a back cover 5 is attached by a plurality of screws 5*b* (refer to FIG. 5) via a waterproof packing 5*a*. In this wristwatch case 1**, a timepiece module (not shown) is provided.

This wristwatch case 1 includes a case main body 6, an exterior member 7 and a fixing member 8, as shown in FIG. 1 to FIG. 3. The case main body 6 is made of a light-weight and high-strength synthetic resin acquired by carbon fiber or glass fiber being mixed into a highly rigid polyamide resin. In a peripheral portion of this case main body 6, a metal reinforcement member **6*a* is embedded, a portion of which protrudes toward the inner side of the case main body 6. Note that the material of this case main body 6** is not limited to synthetic resin and may be metal.

On the twelve o'clock side and six o'clock side of this case main body 6, band attachment main bodies 10 of the band attachment sections 2 are provided projecting outward, as shown in FIG. 2 and FIG. 3. Each band attachment main body 10 includes an attachment projection section 10*a* provided projecting outward from the outer peripheral surface of the case main body, and a pair of attachment arm sections 10*b* provided on side portions of the attachment projection section 10*a*.

This band attachment main body 10 is structured such that an end portion of the corresponding watch band (not shown) is arranged and attached between the pair of attachment arm sections 10*b*, and the attachment projection section 10*a* and the pair of attachment arm sections 10*b* are covered by a later-described cover section 16 of the fixing member 8, as shown in FIG. 2 and FIG. 3. Also, on the two o" clock side, four o'clock side, eight o'clock side and ten o'clock side of this wristwatch case 1, a plurality of attachment cylindrical sections 11 into which operation buttons (not shown) of the plurality of switch sections 3 are inserted to be attached is provided projecting toward the outside of the case main body 6, as shown in FIG. 1 and FIG. 2.

The exterior member 7 includes an exterior main body 12 which is arranged covering the outer surface of the case main body 6, and fixing projection sections 13 formed on predetermined lower edge portions of the exterior main body 12 while projecting toward outer peripheral sides, as shown in FIG. 1 to FIG. 3. This exterior member 7 is a decorative member and made of a highly rigid metal such as stainless steel and titanium alloy.

The exterior main body 12 is formed to be arranged covering the upper surface of the case main body 6 and the outer peripheral surface of an upper portion of the case main body 6 which corresponds to a portion where the watch glass 4 is attached, as shown in FIG. 1 to FIG. 3. More specifically, this exterior main body 12 includes an upper surface section 12*a* which is arranged on the upper surface of the case main body 6, and a side surface section 12*b* which is arranged on the outer peripheral portion of the upper side of the case main body 6 or, in other words, the outer peripheral surface of the upper portion of the case main body 6 which corresponds to the portion where the watch glass 4 is attached.

Figure 4:
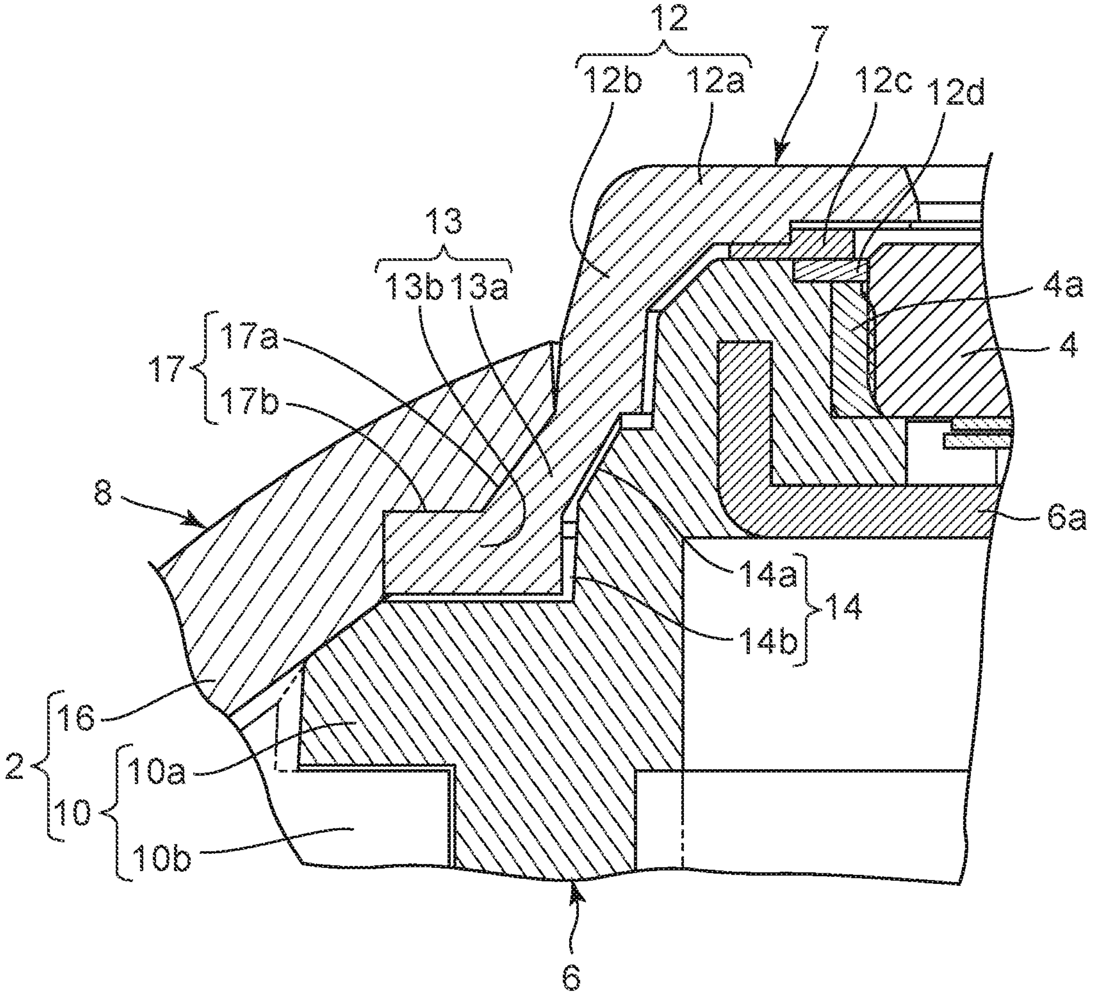
FIG. 4 is an enlarged cross-sectional view of the A portion of the wristwatch case shown in FIG. 3.

In an area between the upper surface section 12*a* of the exterior main body 12 and the upper surface of the case main body 6, a buffering sheet 12*c* is arranged, as shown in FIG. 4. This buffering sheet 12*c*, which buffers an external impact exerted on the exterior member 7 such that the impact is not transmitted to the case main body 6, is attached to the upper surface of the case main body 6 and the upper surface of the glass packing 4*a* of the watch glass 4 with a double coated adhesive tape 12*d*.

The fixing projection sections 13 are formed projecting outward from the lower edge portions of the exterior main body 12 on the six o'clock side and the twelve o'clock side along the band attachment main bodies 10 of the case main body 6 in the band attachment sections 2 of the wristwatch case 1, as shown in FIG. 2 to FIG. 4. More specifically, each fixing projection section 13 includes an inclined section 13*a* inclined diagonally downward from the corresponding lower edge portion of the exterior main body 12 toward the outside of the case main body 6, and a leg section 13*b* provided in a flat plate shape on the lower end of this inclined section 13*a*. This leg section 13*b* is formed such that its thickness is equal to or greater than that of the exterior main body 12 so as to have sufficient strength.

Also, the fixing projection sections 13 are structured such that, when the exterior main body 12 is arranged on the upper surface of the case main body 6 and the outer peripheral surface of the upper portion of the case main body 6, these fixing projection sections 13 are arranged on placement sections 14 formed in the band attachment main bodies 10 of the case main body 6, as shown in FIG. 2 to FIG. 4. More specifically, each placement section 14 includes an inclined surface section 14*a* on which the inclined section 13*a* of the corresponding fixing projection section 13 is arranged, and a recess section 14*b* on which the leg section 13*b* is arranged. The inclined surface section 14*a* is formed to have the same inclination as the inclined section 13*a* of the fixing projection section 13, and the recess section 14*b* is formed to have the same shape and size as the leg section 13*b*.

The fixing member 8, which also serves as a decorative second exterior member, is made of an elastic synthetic resin such as urethane resin, as shown in FIG. 1 to FIG. 3. This fixing member 8 is structured to be attached to the outer peripheral surface of the case main body 6 and fix the exterior member 7 to the case main body 6 with the exterior main body 12 of the exterior member 7 being exposed.

More specifically, this fixing member 8 includes a fixing main body section 15 which is arranged covering the outer peripheral surface of the case main body 6, and a pair of cover sections 16 which is arranged covering the band attachment main bodies 10 on the six o'clock side and twelve o'clock side of the case main body 6, as shown in FIG. 1 to FIG. 3. The fixing main body section 15 is formed to be arranged covering the outer peripheral surface of the case main body 6 excluding a portion where the exterior main body 12 of the exterior member 7 is arranged.

More specifically, in this fixing main body section 15, an opening section 15*a* into which the exterior main body 12 of the exterior main body 7 is inserted to protrude upward is formed in the same shape as the outer shape of the exterior main body 12, as shown in FIG. 2. Also, in this fixing main body section 15, a plurality of switch insertion holes 15*b* is formed into which the attachment cylindrical sections 11 of the plurality of switch sections 3 provided on the two o'clock side, four o'clock side, eight o'clock side and ten o'clock side of the case main body 6 are inserted and arranged. These switch insertion holes 15*b*, into which the operation buttons (not shown) of the plurality of switch sections 3 are inserted, are formed such that each inner diameter is greater than the outer diameter of each attachment cylindrical section 11.

On the other hand, the pair of cover sections 16 is structured to be arranged covering the band attachment main bodies 10 provided on the six o'clock side and twelve o'clock side of the case main body 6, as shown in FIG. 1 to FIG. 3. More specifically, each of these cover sections 16 is arranged covering the upper surface and side surfaces of the corresponding band attachment main body 10 of the case main body 6, which are sides of the outer surface of the pair of attachment arm sections 10*b* of the band attachment main body 10. That is, each band attachment section 2 of the wristwatch case 1 includes the corresponding band attachment main body 10 of the case main body 6 and the corresponding cover section 16 of the fixing member 8.

In the inner surfaces of these cover sections 16, hold down sections 17 are provided which hold down the fixing projection sections 13 of the exterior member 7 on the placement sections 14 formed in the attachment projection sections 10*a* of the band attachment main bodies 10 of the case main body 6, as shown in FIG. 2 to FIG. 4. Each hold down section 17 includes an inclined first hold down section 17*a* which holds down the inclined section 13*a* of the fixing projection section 13 on the inclined surface section 14*a* of the corresponding placement section 14, and a second hold down section 17*b* which holds down the leg section 13*b* on the recess section 14*b* of the placement section 14.

As a result, the fixing member 8 is structured such that, when the fixing main body section 15 is arranged on the outer peripheral surface of the case main body 6 and the cover sections 16 are arranged on the band attachment main bodies 10 of the case main body 6 with the exterior main body 12 of the exterior member 7 on the upper surface and outer peripheral surface of the upper portion of the case main body 6 protruding upward from the opening section 15*a* of the fixing main body section 15 and being exposed, the hold down sections 17 of the cover sections 16 hold down the fixing projection sections 13 of the exterior member 7 on the placement sections 14 of the attachment projection sections 10*a* of the case main body 6 so as to fix the exterior member 7 to the case main body 6, as shown in FIG. 3.

More specifically, this fixing member 8 is structured such that, when the cover sections 16 are arranged on the band attachment main bodies 10, the first hold down sections 17*a* of the hold down sections 17 of the cover sections 16 hold down the inclined sections 13*a* of the fixing projection sections 13 of the exterior member 7 on the inclined surface sections 14*a* of the placement sections 14 formed in the attachment projection sections 10*a* of the case main body 6 and the second hold down sections 17*b* of the hold down sections 17 hold down the leg sections 13*b* of the fixing projection sections 13 on the recess sections 14*b* of the placement sections 14 of the case main body 6 so as to fix the exterior member 7 to the case main body 6, as shown in FIG. 3.

Also, this fixing member 8 includes detachment prevention sections 18 which restrict the fixing member 8 from upwardly slipping off the case main body 6, and press down restriction sections 19 which restrict the fixing member 8 from being pressed down against the case main body 6, as shown in FIG. 5 to FIG. 8. As a result, the fixing member 8 is structured to be attached to the case member 6 with its vertical position with respect to the case main body 6 being restricted by the detachment prevention sections 18 and the press down restriction sections 19.

Figure 5:
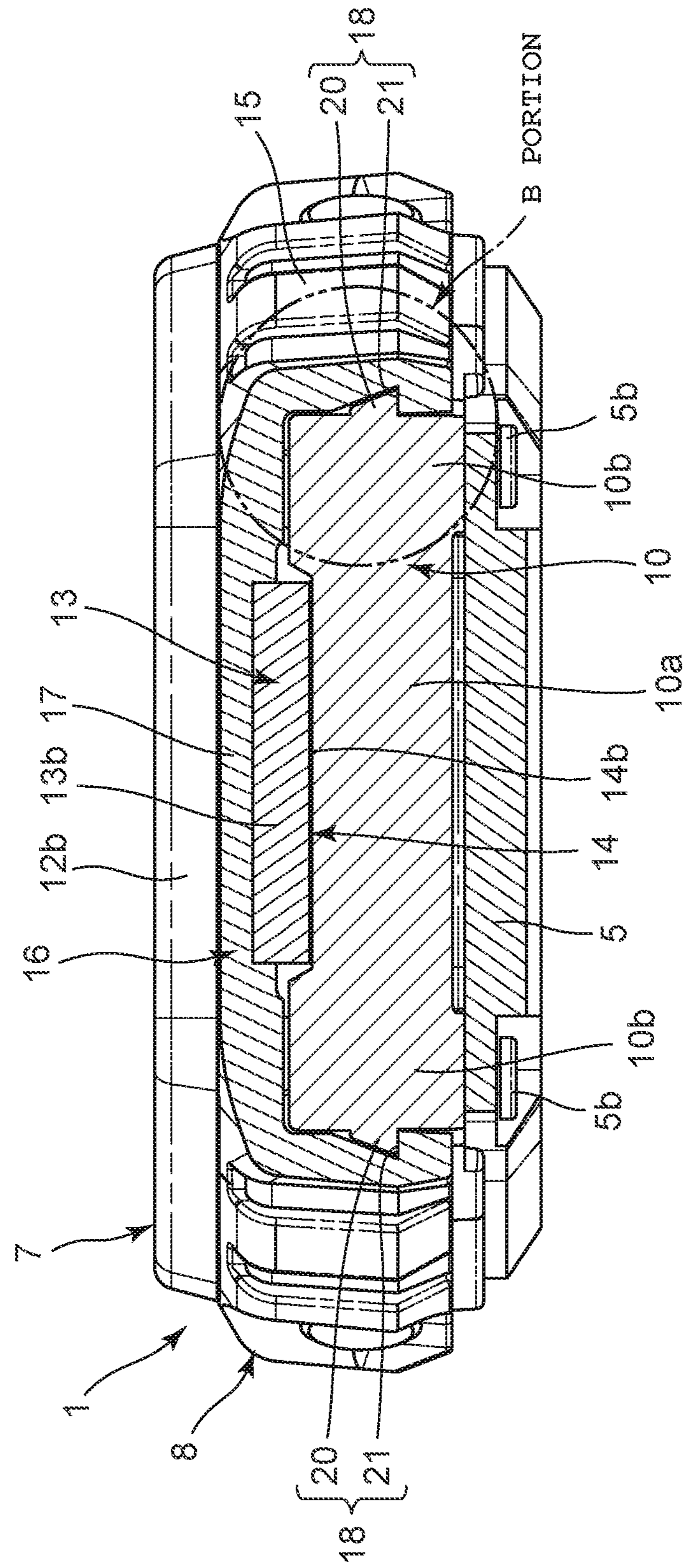
FIG. 5 is an enlarged cross-sectional view of the wristwatch case taken along the B-B arrow view in FIG. 1.
Figure 6:
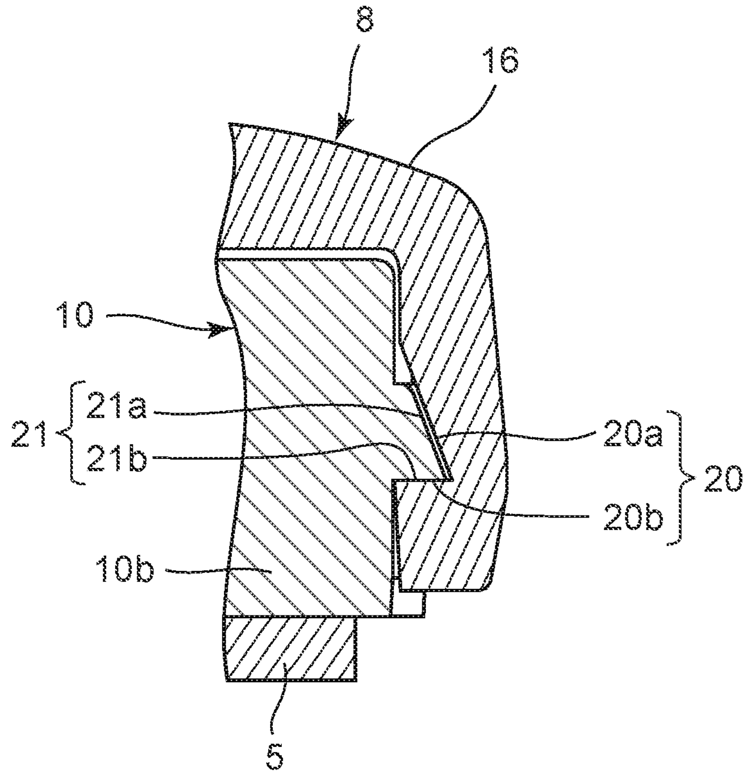
FIG. 6 is an enlarged cross-sectional view of the B portion of the wristwatch case shown in FIG. 5.

The detachment prevention sections 18 include a plurality of first engaging projection sections 20 which are formed on the band attachment main bodies 10, and a plurality of first catching recess sections 21 which are formed in the inner surfaces of the cover sections 16 and with which the plurality of first engaging projection sections 20 is engaged, as shown in FIG. 2, FIG. 5 and FIG. 6. The plurality of first engaging projection sections 20 is formed on the sides of the outer surface of the pair of attachment arm sections 10*b* in each band attachment main body 10 of the case main body 6.

The plurality of first engaging projection sections 20 provided on the sides of the outer surface of the pair of attachment arm sections 10*b* in each band attachment main body 10 is structured such that the corresponding fixing projection section 13 of the exterior member 7 is arranged therebetween, as shown in FIG. 2, FIG. 5 and FIG. 6. Each of these first engaging projection sections 20 is a projection whose cross-section has a substantially right triangle shape that gradually projects further from its upper side to its lower side, and has a first inclined surface 20*a* and a first lower surface 20*b*.

The plurality of first catching recess sections 21 is inclined recess sections which have substantially rectangular shapes and with which the plurality of first engaging projection sections 20 is engaged, as shown in FIG. 2, FIG. 5 and FIG. 6. These first catching recess sections 21 are formed in sides of the inner surface of each cover section 16 of the fixing member 8 which corresponds to the sides of the outer surface of the pair of attachment arm sections 10*b* in each band attachment main body 10 of the case main body 6. More specifically, each first catching recess section 21 is formed to be an inclined recess section whose depth gradually becomes greater from its upper side to its lower side. Here, each of these first catching recess sections 21 has an upper side inclined surface 21*a* and a lower side inner surface 21*b*.

As a result, the detachment prevention sections 18 are structured such that, when the fixing member 8 is arranged covering the case main body 6, the plurality of first engaging projection sections 20 engages with the plurality of first catching recess sections 21, as shown in FIG. 2, FIG. 5 and FIG. 6. More specifically, these detachment prevention sections 18 are structured such that, when the cover sections 16 of the fixing member 8 are arranged covering the band attachment main bodies 10 of the case main body 6, the sides of the inner surfaces of the cover sections 16 are elastically deformed along the first inclined surfaces 20*a* of the first engaging projection sections 20 and the first engaging projection sections 20 engage with the plurality of first catching recess sections 21.

Also, these detachment prevention sections 18 are structured such that, when the cover sections 16 are elastically deformed and the first engaging projection sections 20 are inserted into and engaged with the first catching recess sections 21, the first engaging projection sections 20 are caught by the first catching recess sections 21 by the first inclined surfaces 20*a* of the first engaging projection sections 20 coming in pressure contact with the upper side inclined surfaces 21*a* in the first catching recess sections 21 and the first lower surfaces 20*b* of the first engaging projection sections 20 being pressed against the lower side inner surfaces 21*b* of the first catching recess sections 21, as shown in FIG. 2, FIG. 5 and FIG. 6. That is, the cover sections 16 of the fixing member 8 are structured to be attached to the band attachment main bodies 10 of the case main body 6 in a manner not to upwardly slip off the case main body 6.

Figure 7:
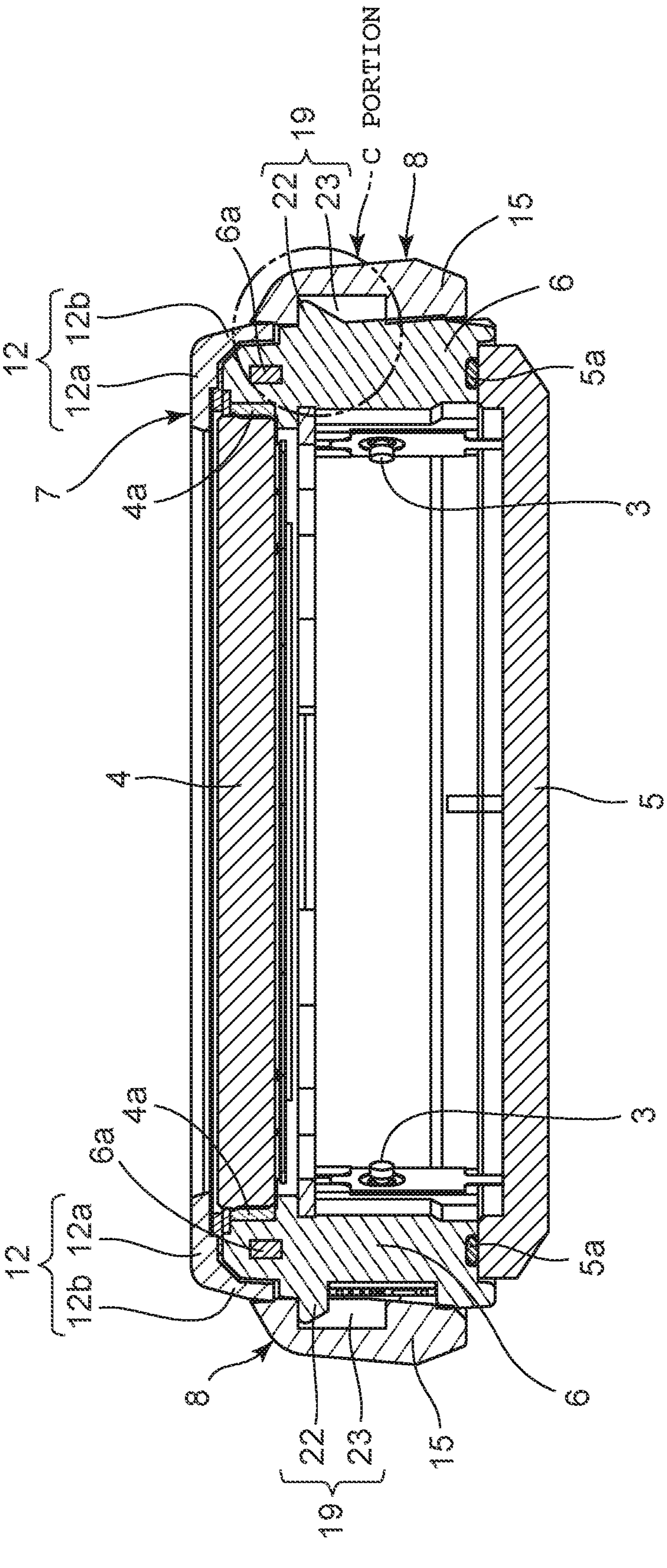
FIG. 7 is an enlarged cross-sectional view of the wristwatch case taken along the C-C arrow view in FIG. 1.
Figure 8:
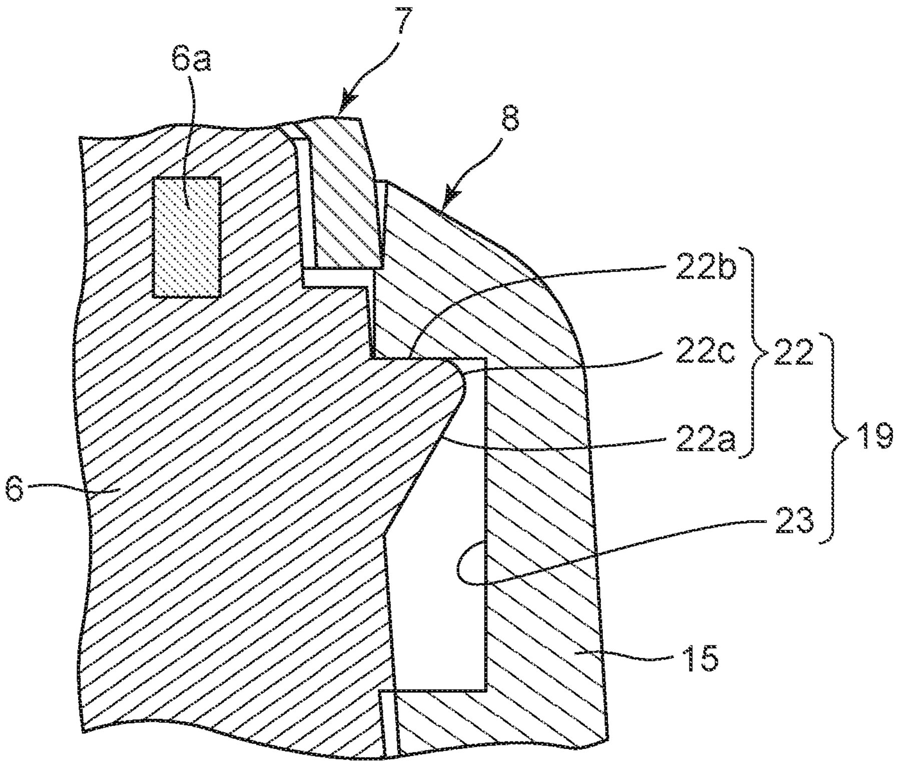
FIG. 8 is an enlarged cross-sectional view of the C portion of the wristwatch case shown in FIG. 7.

On the other hand, the press down restriction sections 19 include a plurality of second engaging projection sections 22 which is provided on outer peripheral portions of the case main body 6, and a plurality of second catching recess sections 23 which is provided in the inner surface of the fixing member 8 and with which the plurality of second engaging projection sections 22 is engaged, as shown in FIG. 2, FIG. 7 and FIG. 8. As a result, the press down restriction sections 19 are structured to restrict the fixing member 8 from being pressed down against the case main body 6 when the plurality of second engaging projection sections 22 engages with the plurality of second catching recess sections 23.

The plurality of second engaging projection sections 22 is provided on portions on the three o'clock side and nine o'clock side of the outer peripheral surface of the case main body 6 which are positioned below the exterior main body 12 of the exterior main body 7, as shown in FIG. 2, FIG. 7 and FIG. 8. Each of these second engaging projection sections 22 is an overhang projection whose cross-section has a substantially right triangle shape that gradually projects further from its lower side to its upper side, and has a second inclined surface 22*a* and a second upper surface 22*b*. Also, on an edge portion between the second inclined surface 22*a* and the second upper surface 22*b*, an arc-shaped chamfered section 22*c* is formed.

The plurality of second catching recess sections 23 is substantially rectangular recess sections with which the plurality of second engaging projection sections 22 is engaged, as shown in FIG. 2, FIG. 7 and FIG. 8. These second catching recess sections 23 are provided in inner surface portions of the fixing main body section 15 of the fixing member 8 corresponding to the three o'clock side and nine o'clock side of the outer peripheral surface of the case main body 6. As a result, the plurality of second catching recess sections 23 is structured such that, when the fixing main body section 15 of the fixing member 8 is arranged covering the case main body 6, the plurality of second engaging projection sections 22 engages with these second catching recess sections 23.

That is, the press down restriction sections 19 are structured such that, when the fixing main body section 15 of the fixing member 8 is arranged covering the case main body 6, the inner surface of the fixing main body section 15 is elastically deformed to be stretched by the arc-shaped chamfered sections 22*c* provided on the edge portions between the second inclined surfaces 22*a* and the second upper surfaces 22*b* of the second engaging projection sections 22 and the second engaging projection sections 22 engage with the second catching recess sections 23, as shown in FIG. 2, FIG. 7 and FIG. 8.

Also, these press down restriction sections 19 are structured such that, when the fixing main body section 15 is elastically deformed and the second engaging projection sections 22 are inserted into and engaged with the second catching recess sections 23, the second engaging projection sections 22 are caught by the second catching recess sections 23 by the second upper surfaces 22*b* of the second engaging projection sections 22 being pressed against the upper inner surfaces of the second catching recess sections 23. As a result, these press down restriction sections 19 are structured to attach the fixing member 8 to the case main body 6 while defining the lower limit position of the fixing main body section 15 so that the fixing main body section 15 of the fixing member 8 does not downwardly slip off the case main body 6.

Next, a procedure for assembling this wristwatch case 1 is described. In this procedure, first, the watch glass 4 is mounted in the upper opening of the case main body 6 together with the glass packing 4*a*, and the timepiece module (not shown) is mounted in the case main body 6. In this state, the back cover 5 is attached to the lower part of the case main body 6 together with the waterproof packing 5*a*, or the exterior member 7 is attached to the case main body 6 by the fixing member 8 and then the back cover 5 is attached to the lower part of the case main body 6 together with the waterproof packing 5*a*.

Subsequently, the exterior member 7 is arranged on the case main body 6. Here, the exterior main body 12 of the exterior member 7 is arranged on the upper portion of the case main body 6. More specifically, the upper surface section 12*a* of the exterior main body 12 is arranged covering the upper surface of the case main body 6, and the side surface section 12*b* is arranged covering the outer peripheral surface of the upper portion of the case main body 6 which corresponds to the portion mounted with the watch glass 4.

Also, here, the fixing projection sections 13 of the exterior member 7 are arranged on the placement sections 14 formed in the band attachment main bodies 10 of the case main body 6. More specifically, when the exterior main body 12 is arranged on the upper surface of the case main body 6 and the outer peripheral surface of the upper portion of the case main body 6 and the fixing projection sections 13 are arranged on the placement sections 14 of the band attachment main bodies 10 of the case main body 6, the inclined sections 13*a* of the fixing projection sections 13 are arranged on the inclined surface sections 14*a* of the placement sections 14 and the leg sections 13*b* of the fixing projection sections 13 are arranged on the recess sections 14*b* of the placement sections 14.

In this state, the fixing member 8 is attached to the outer peripheral surface of the case main body 6 so as to fix the exterior member 7 to the case main body 6. Here, the exterior main body 12 of the exterior member 7 arranged on the outer peripheral surface of the upper portion of the case main body 6 is inserted into the opening section 15*a* of the fixing main body section 15 of the fixing member 8, and protrudes above the fixing main body section 15 so as to be exposed.

Accordingly, the fixing main body section 15 of the fixing member 8 is arranged covering the outer peripheral portion of the case main body 6 positioned below the exterior main body 12, and the pair of cover sections 16 is arranged covering the pair of band attachment main bodies 10 on the six o'clock side and the twelve o'clock side of the case main body 6. Here, the plurality of attachment cylindrical sections 11 provided projecting outward on the two o'clock side, four o'clock side, eight o'clock side and ten o'clock side of the case main body 6 is inserted into the plurality of switch insertion holes 15*b* of the fixing main body section 15.

Also, here, the hold down sections 17 provided in the inner surfaces of the pair of cover sections 16 hold down the fixing projection sections 13 of the exterior member 7 on the placement sections 14 of the case main body 6 so as to fix the exterior member 7 to the case main body 6. More specifically, the inclined first hold down sections 17*a* of the hold down sections 17 of the cover sections 16 hold down the inclined sections 13*a* of the fixing projection sections 13 on the inclined surface sections 14*a* of the placement sections 14, and the second hold down sections 17*b* hold down the leg sections 13*b* of the fixing projection sections 13 on the recess sections 14*b* of the placement sections 14.

As a result, the hold down sections 17 of the fixing member 8 hold down the fixing projection sections 13 of the exterior member 7 on the placement sections 14 of the case main body 6 with the exterior main body 12 of the exterior member 7 being arranged on the outer peripheral surface of the upper portion of the case main body 6 and exposed above the fixing main body section 15 of the fixing member 8. Accordingly, the exterior member 7 is fixed to the case main body 6. In this state, the fixing member 8 has been attached to the case main body 6 with its position with respect to the case main body 6 being restricted by the detachment prevention sections 18 and the press down restriction sections 19.

In the case of these detachment prevention sections 18, when the cover sections 16 of the fixing member 8 are arranged covering the band attachment main bodies 10 of the case main body 6, the sides of the inner surfaces of the cover sections 16 are elastically deformed to be gradually stretched along the first inclined surfaces 20*a* of the first engaging projection sections 20 and the first engaging projection sections 20 engage with the first catching recess sections 21.

Then, in the detachment prevention sections 18, the first inclined surfaces 20*a* of the first engaging projection sections 20 come in pressure contact with the upper side inclined surfaces 21*a* of the first catching recess sections 21, and the first lower surfaces 20*b* of the first engaging projection sections 20 are pressed against the lower side inner surfaces 21*b* of the first catching recess sections 21, whereby the first engaging projection sections 20 are locked. As a result, the cover sections 16 of the fixing member 8 are attached to the band attachment main bodies 10 of the case main body 6 in a manner not to upwardly slip off the case main body 6.

Here, the plurality of first engaging projection sections 20 has been formed on the pairs of attachment arm sections 10*b* at the sides of the band attachment main bodies 10 of the case main body 6 and each fixing projection section 13 of the exterior member 7 has been arranged between the corresponding first engaging projection sections 20. Accordingly, when the plurality of first engaging projection sections 20 is engaged with the plurality of first catching recess sections 21, the hold down sections 17 of the fixing member 8 reliably hold down the fixing projection sections 13 of the exterior member 7, and the cover sections 16 of the fixing member 8 are reliably attached to the band attachment main bodies 10 of the case main body 6.

With regard to the press down restriction sections 19, when the fixing main body section 15 of the fixing member 8 is arranged covering the case main body 6, the inner surface of the fixing main body section 15 is elastically deformed to be stretched by the arc-shaped chamfered sections 22*c* formed on the edge portions between the second inclined surfaces 22*a* and the second upper surfaces 22*b* of the second engaging projection sections 22, and the second engaging projection sections 22 engage with the second catching recess sections 23.

Here, in the press down restriction sections 19, the second upper surfaces 22*b* of the second engaging projection sections 22 are pressed against the upper inner surfaces of the second catching recess sections 23, whereby the second engaging projection sections 22 are locked. In this state, the fixing member 8 has been attached to the case main body 6 with the press down restriction sections 19 defining the lower limit position of the fixing main body section 15 of the fixing member 8 such that the fixing main body section 15 does not downwardly slip off the case main body 6.

As a result, the exterior member 7 is attached to the case main body 6 with the position of the fixing member 8 with respect to the case main body 6 being restricted by the detachment prevention sections 18 and the press down restriction sections 19 and the exterior main body 12 being arranged on the outer peripheral surface of the upper portion of the case main body 6 and exposed above the fixing main body section 15 of the fixing member 8. Here, by the hold down sections 17 of the fixing member 8 reliably holding down the fixing projection sections 13 on the placement sections 14 of the case main body 6, the exterior member 7 is reliably and favorably fixed to the case main body 6.

Next, a procedure for switching the exterior member 7 of this wristwatch case 1 is described. In this embodiment, the exterior member 7 can be easily detached and switched simply by the fixing member 8 being detached from the case main body 6. More specifically, when the fixing member 8 is to be detached from the case main body 6, the cover sections 16 of the fixing member 8 attached covering the band attachment main bodies 10 of the case main body 6 are shifted upward, whereby the restriction by the detachment prevention sections 18 is released.

Here, when the cover sections 16 of the fixing member 8 are elastically deformed to be warped and shifted upward, the first catching recess sections 21 formed in side portions of the cover sections 16 are disengaged from the first engaging projection sections 20 provided on the pairs of attachment arm sections 10*b* of the band attachment main bodies 10. As a result, the restriction on the fixing member 8 by the detachment prevention sections 18 is released, whereby the hold down of the fixing projection sections 13 of the exterior member 7 by the hold down sections 17 of the fixing member 8 is released.

More specifically, when the restriction on the fixing member 8 by the detachment prevention sections 18 is released, the hold down sections 17 of the fixing member 8 lift from the band attachment main bodies 10 of the case main body 6, whereby the hold down of the inclined sections 13*a* of the fixing projection sections 13 of the exterior member 7 by the first hold down sections 17*a* of the hold down sections 17 and the hold down of the leg sections 13*b* of the fixing projection sections 13 of the exterior member 7 by the second hold down sections 17*a* of the hold down sections 17 are released.

Also, here, the attachment cylindrical sections 11 of the plurality of switch sections 3 provided projecting outward on the two o'clock side, four o'clock side, eight o'clock side and ten o'clock side of the case main body 6 are separated from the plurality of switch insertion holes 15*b* formed in the fixing main body section 15 of the fixing member 8, and the restriction on the fixing member 8 by the press down restriction sections 19 is released.

In this state, the fixing main body section 15 is detached from the exterior main body 12 of the exterior member 7 via the opening section 15*a* of the fixing main body section 15 of the fixing member 8. As a result, the fixing member 8 is detached from the case main body 6, whereby the exterior member 7 is detached from the case main body 6. Accordingly, the exterior member 7 can be easily switched.

When the exterior member 7 is switched as described above, the design and the appearance are changed by a new exterior member 7. In this embodiment, since the exterior member 7 is made of a decorative metal such as stainless steel and titanium alloy and the fixing member 8 is made of an elastic synthetic resin such as urethane, the decorative effect is improved by the differences in color, texture and the like between the exterior member 7 and the fixing member 8.

As described above, the exterior member 7 of this wristwatch includes the exterior main body 12 which is arranged covering the outer surface of the case main body 6, and the fixing projection sections 13 which are formed on the predetermined lower edge portions of the exterior main body 12 while projecting toward the outer peripheral sides and held down on the case main body 6 by the fixing member 8 attached covering the outer peripheral surface of the case main body 6 excluding the exterior main body 12 so as to fix the exterior main body 12 to the case main body 6. As a result the exterior member 7 can be easily switched.

That is, the exterior member 7 of this wristwatch has the simple structure where the fixing projection sections 13 formed on the predetermined lower edge portions of the exterior main body 12 are merely held down on the case main body 6 by the fixing member 8. As a result, the exterior main body 12 and the fixing projection sections 13 can be detached from the case main body 6 by the fixing member 8 being detached from the case main body 6, whereby the exterior member 7 can be easily switched.

Also, the wristwatch case 1 of this wristwatch includes the case main body 6, the exterior member 7 which has the exterior main body 12 arranged covering the outer surface of the case main body 6 and the fixing projection sections 13 formed on the predetermined lower edge portions of the exterior main body 12 while projecting toward the outer peripheral sides, and the fixing member 8 which is attached covering the outer peripheral surface of the case main body 6 with the exterior main body 12 of the exterior member 7 being exposed and holds down the fixing projection sections 13 on the case main body 6 so as to fix the exterior member 7 to the case main body 6. As a result, the exterior 7 can be easily switched.

That is, the wristwatch case 1 of this wristwatch has the simple structure where the fixing projection sections 13 formed on the predetermined lower edge portions of the exterior main body 12 are merely held down on the case main body 6 by the fixing member 8. As a result, the exterior main body 12 and the fixing projection sections 13 can be easily detached by the fixing member 8 being detached from the case main body 6, whereby the exterior member 7 can be easily switched.

Also, in the case of this wristwatch case 1, the exterior member 7 is made of metal, and the fixing member 8 is made of an elastic synthetic resin. As a result, the attachment and detachment of the fixing member 8 to and from the case main body 6 can be easily performed. That is, the fixing member 8 can be elastically deformed to be easily attached to and detached from the case main body 6, whereby the exterior member 7 can be easily and favorably switched.

Moreover, since this wristwatch case 1 has the two part structure where the exterior member 7 is made of metal and the fixing member 8 is made of an elastic synthetic resin, the design and the appearance can be improved by the differences in color, texture and the like between the exterior member 7 and the fixing member 8, whereby the wristwatch case 1 having a high decorative effect can be provided.

Also, in this wristwatch case 1, the fixing member 8 includes the hold down sections 17 which hold down the fixing projection sections 13 on the case main body 6. As a result, when the fixing member 8 is attached to the outer peripheral surface of the case main body 6 with the exterior main body 12 of the exterior member 7 being exposed, the fixing projection sections 13 of the exterior member 7 can be reliably and favorably held down and fixed on the case main body 6 by the hold down sections 17 of the fixing member 8.

Moreover, in this wristwatch case 1, by being provided on the six o'clock side and the twelve o'clock side, the fixing projection sections 13 of the exterior member 7 can be arranged in the band attachment sections 2 on the six o'clock side and twelve o'clock side of the wristwatch case 1. As a result, even though the fixing projection sections 13 project toward the outer peripheral sides of the exterior main body 12, they do not become obstructive and can be reliably held down and fixed on the band attachment main bodies 10 of the band attachment sections 2 by the fixing member 8.

Furthermore, in this wristwatch case 1, the fixing projection sections 13 include the inclined sections 13*a* and the leg sections 13*b*, and the hold down sections 17 include the first hold down sections 17*a* and the second hold down sections 17*b*. As a result, when the fixing member 8 is attached to the outer peripheral surface of the case main body 6, the inclined sections 13*a* of the fixing projection sections 13 can be reliably and favorably held down on the case main body 6 by the first hold down sections 17*a* of the hold down sections 17, and the leg sections 13*b* of the fixing projection sections 13 can be reliably and favorably held down on the case main body 6 by the second hold down sections 17*b* of the hold down sections 17.

Still further, in this wristwatch case 1, the band attachment main bodies 10 are provided on the six o'clock side and twelve o'clock side of the case main body 6, and the placement sections 14 on which the fixing projection sections 13 are arranged are formed in the attachment projection sections 10*a* of the band attachment main bodies 10, whereby the fixing projection sections 13 of the exterior member 7 can be arranged on the placement sections 14 provided in the band attachment sections 2 of the wristwatch case 1. As a result of this structure, by the hold down sections 17 of the fixing member 8, the fixing projection sections 13 can be reliably held down and fixed on the placement sections 14 of the attachment projection sections 10*a* of the band attachment main bodies 10.

More specifically, in this wristwatch case 1, the placement sections 14 include the inclined surface sections 14*a* and the recess sections 14*b*, the inclined sections 13*a* of the fixing projection sections 13 can be arranged on the inclined surface sections 14*a* of the placement sections 14, and the leg sections 13*b* of the fixing projection sections 13 can be arranged in the recess sections 14*b* of the placement sections 14. As a result of this structure, by the hold down sections 17 of the fixing member 8, the inclined sections 13*a* of the fixing projection sections 13 can be reliably held down on the inclined surface sections 14*a* of the placement sections 14, and the leg sections 13*b* of the fixing projection sections 13 can be reliably held down on the recess sections 14*b* of the placement sections 14.

Also, this wristwatch case 1 includes the detachment prevention sections 18 which restrict the fixing member 8 from upwardly slipping off the case main body 6, and the press down restriction sections 19 which restrict the fixing member 8 from being pressed down against the case main body 6. As a result, the vertical position of the fixing member 8 with respect to the case main body 6 can be reliably and favorably restricted by the detachment prevention sections 18 and the press down restriction sections 19, whereby the fixing member 8 can be reliably attached to the case main body 6.

Moreover, the detachment prevention sections 18 include the plurality of first engaging projection sections 20 which is provided on outer peripheral portions of the case main body 6, and the plurality of first catching recess sections 21 which is provided in the inner surface of the fixing member 8 and with which the plurality of first engaging projection sections 20 is engaged. As a result the fixing member 8 can be reliably restricted from upwardly slipping off the case main body 6 and reliably attached to the case main body 6.

More specifically, in these detachment prevention sections 18, the first engaging projection sections 20 are projections whose cross-sections have substantially right triangle shapes that gradually project further from their upper sides to their lower sides and which have the first inclined surfaces 20*a* and the first lower surfaces 20*b*, and the first catching recess sections 21 are inclined recess sections whose depths gradually become greater from their upper sides to their lower side. As a result, when the fixing member 8 is attached covering the case main body 6, the inner surface of the fixing member 8 can be elastically deformed to be gradually stretched along the first inclined surfaces 20*a* of the first engaging projection sections 20, and the first engaging projection sections 20 can be favorably engaged with the first catching recess sections 21.

Also, in these detachment prevention sections 18, when the fixing member 8 is elastically deformed to be gradually stretched and the first engaging projection sections 20 is inserted into and engaged with the first catching recess sections 21, the first inclined surfaces 20*a* of the first engaging projection sections 20 come in pressure contact with the upper side inclined surfaces 21*a* of the first catching recess sections 21 and the first lower surfaces 20*b* of the first engaging projection sections 20 are reliably and favorably pressed against the lower side inner surfaces 21*b* of the first catching recess sections 21, whereby the first engaging projection sections 20 can be caught by the first catching recess sections 21. As a result, the fixing member 8 can be attached to the case main body 6 in a manner not to upwardly slip off the case main body 6.

Also, in this wristwatch case 1, the plurality of first engaging projection sections 20 is provided on the pairs of attachment arm sections 10*b* at the sides of the band attachment main bodies 10 of the case main body 6, and the fixing projection sections 13 of the exterior member 7 are arranged between the corresponding first engaging projection sections 20. As a result, the plurality of first engaging projection sections 20 can be engaged with the plurality of first catching recess sections 21 and the cover sections 16 of the fixing member 8 can be held down on and attached to the band attachment main bodies 10 of the case main body 6, whereby the fixing projection sections 13 of the exterior member 7 arranged between the plurality of first engaging projection sections 20 can be reliably held down by the hold down member 17 of the fixing member 8.

Moreover, in this wristwatch case 1, the press down restriction sections 19 include the plurality of second engaging projection sections 22 which is formed on the outer peripheral portions of the case main body 6, and the plurality of second catching recess sections 23 which is provided in the inner surface of the fixing member 8 and with which the plurality of second engaging projection sections 22 is engaged. As a result, the fixing member 8 can be reliably restricted from being pressed down against the case main body 6 and reliably attached to the case main body 6.

More specifically, in these press down restriction sections 19, the second engaging projection sections 22 are overhang projections whose cross-sections have substantially right triangle shapes that gradually project further from their lower sides to their upper sides and which have the second inclined surfaces 22*a*, the second upper surfaces 22*b* and the arc-shaped chamfered sections 22*c*, and the second catching recess sections 23 are substantially rectangular recess sections. As a result, when the fixing member 8 is attached covering the case main body 6, the inner surface of the fixing main body section 15 can be elastically deformed to be stretched by the arc-shaped chamfered sections 22*c* of the second engaging projection sections 22, and the second engaging projection sections 22 can be reliably and favorably engaged with the second catching recess sections 23.

In the case of the press down restriction sections 19 of the present embodiment, when the fixing member is elastically deformed and the second engaging projection sections 22 are inserted into and engaged with the second catching recess sections 23, the second engaging projection sections 22 are caught by the second catching recess sections 23 by the second upper surfaces 22*b* of the second engaging projection sections 22 being pressed against the upper inner surfaces of the second catching recess sections 23. As a result, the fixing member 8 can be favorably attached to the case main body 6 with the lower limit position of the fixing main body section 15 being defined so that the fixing main body section 15 of the fixing member 8 does not downwardly slip off the case main body 6.

In the above-described embodiment, the fixing projection sections 13 are provided on the six o'clock side and twelve o'clock side of the exterior member 7. However, the present invention is not limited thereto, and the fixing projection sections 13 may be provided on any portion of the lower edges of the exterior member 7. Also, the number of the fixing projection sections 13 is not necessarily required to be two, and three or more of them may be provided.

Also, in the above-described embodiment, the detachment prevention sections 18 are provided on the six o'clock side and twelve o'clock side of the case main body 6 and those of the fixing member 8. However, the present invention is not limited thereto, and the detachment prevention sections 18 may be provided at any portion of the case main body 6 and the fixing member 8. Also, the detachment prevention sections 18 are not necessarily required to be provided in two portions and may be provided in three or more portions.

Moreover, in the above-described embodiment, the detachment prevention sections 18 include the first engaging projection sections 20 formed on the case main body 6 and the first catching recess sections 21 formed in the fixing member 8. However, the present invention is not limited thereto, and a structure may be adopted in which the detachment prevention sections 18 include first catching recess sections formed in the case main body 6 and first engaging projection sections formed on the fixing member 8.

Furthermore, in the above-described embodiment, the press down restriction sections 19 are provided on the three o'clock side and nine o'clock side of the case main body 6 and those of the fixing member 8. However, the present invention is not limited thereto, and the press down restriction sections 19 may be provided at any portion of the case main body 6 and the fixing member 8. Also, the press down restriction sections 19 are not necessarily required to be provided in two portions and may be provided in three or more portions.

Still further, in the above-described embodiment, the press down restriction sections 19 include the second engaging projection sections 22 formed on the case main body 6 and the second catching recess sections 23 formed in the fixing member 8. However, the present invention is not limited thereto, and a structure may be adopted in which the press down restriction sections 19 include second catching recess sections formed in the case main body 6 and second engaging projection sections formed on the fixing member 8.

While the present invention has been described with reference to the preferred embodiments, it is intended that the invention be not limited by any of the details of the description therein but includes all the embodiments which fall within the scope of the appended claims.

INDUSTRIAL APPLICABILITY

The present invention is applicable to various types of timepieces such as a travel watch, an alarm clock, a table clock, and a wall clock, and electronic devices such as a cellular phone and a portable information terminal.

The invention claimed is:

1. A case comprising:

a case main body;

an exterior member which has an exterior main body covering an outer surface of the case main body and fixing projection sections formed on predetermined lower edge portions of the exterior main body while projecting toward outer peripheral sides;

a fixing member which is attached covering an outer peripheral surface of the case main body and fixes the exterior member to the case main body by holding down the fixing projection sections on the case main body; and a detachment prevention section which restricts the fixing member from upwardly slipping off the case main body, wherein the detachment prevention section comprises a plurality of first engaging projection sections which is provided on outer peripheral portions of the case main body and a plurality of first catching recess sections which is formed in an inner surface of the fixing member and with which the plurality of first engaging projection sections is engaged.

2. The case according to claim 1, wherein the plurality of first engaging projection sections is provided on side portions of attachment projection sections of the case main body, and wherein the fixing projection sections of the exterior member are arranged between the plurality of first engaging projection sections.

3. A case comprising:

a case main body;

an exterior member which has an exterior main body covering an outer surface of the case main body and fixing projection sections formed on predetermined lower edge portions of the exterior main body while projecting toward outer peripheral sides;

a fixing member which is attached covering an outer peripheral surface of the case main body and fixes the exterior member to the case main body by holding down the fixing projection sections on the case main body; and a press down restriction section which restricts the fixing member from being pressed down against the case main body, wherein the press down restriction section comprises a plurality of second engaging projection sections which is provided on outer peripheral portions of the case main body and a plurality of second catching recess sections which is formed in an inner surface of the fixing member and with which the plurality of second engaging projection sections is engaged.

4. The case according to claim 1, wherein the exterior member is made of metal, and wherein the fixing member is made of an elastic synthetic resin.

5. The case according to claim 1, wherein the fixing member comprises hold down sections which hold down the fixing projection sections on the case main body.

6. The case according to claim 1, wherein the fixing projection sections of the exterior member are provided on a six o'clock side and a twelve o'clock side.

7. The case according to claim 2, wherein the attachment projection sections are provided on a six o'clock side and a twelve o'clock side of the case main body, and placement sections on which the fixing projection sections are arranged are provided in the attachment projection sections.

8. A timepiece comprising the case according to claim 1.

* * * * *